United States Patent [19]

Hiramatsu

[11] Patent Number: 5,247,566
[45] Date of Patent: Sep. 21, 1993

[54] APPARATUS FOR THE TRANSMISSION AND RECEPTION OF DATA

[75] Inventor: Shoji Hiramatsu, Aichi Pref., Japan

[73] Assignee: Aisin Seiki Kabushiki Kaisha, Kariya City, Japan

[21] Appl. No.: 938,585

[22] Filed: Sep. 2, 1992

Related U.S. Application Data

[63] Continuation of Ser. No. 670,108, Mar. 15, 1991, abandoned.

[30] Foreign Application Priority Data

Mar. 15, 1990 [JP] Japan .................................. 2-64734

[51] Int. Cl.$^5$ ........................ H04M 11/00; H04B 1/00
[52] U.S. Cl. ........................................ 379/58; 379/61; 455/49.1
[58] Field of Search .................. 379/56, 58, 60, 63; 455/39, 49, 53, 54.1, 55.1

[56] References Cited

U.S. PATENT DOCUMENTS

| | | | |
|---|---|---|---|
| 4,456,793 | 6/1984 | Baker et al. | 379/60 |
| 4,829,554 | 5/1989 | Barnes et al. | 379/58 |
| 4,837,801 | 6/1989 | Shimura | 376/61 |
| 4,870,696 | 9/1989 | Yorita | 455/49 |
| 5,010,565 | 4/1991 | Nash et al. | 379/61 |
| 5,109,402 | 4/1992 | Anderson et al. | 379/58 |
| 5,125,101 | 6/1992 | Johnson et al. | 455/9 |
| 5,175,759 | 12/1992 | Metroka et al. | 379/58 |

FOREIGN PATENT DOCUMENTS

| | | | |
|---|---|---|---|
| 62-180655 | 8/1987 | Japan | 379/58 |
| 0257051 | 2/1990 | Japan | 379/58 |
| 0257052 | 2/1990 | Japan | 379/58 |

OTHER PUBLICATIONS

Mitsubishi International Corporation "ACCES Cellular Fax Machine" 1991.

Primary Examiner—Curtis Kuntz
Assistant Examiner—William D. Cumming
Attorney, Agent, or Firm—Sughrue, Mion, Zinn, Macpeak & Seas

[57] ABSTRACT

An apparatus for the transmission and reception of data that has signal lines that provide a connection between the movable car telephone and the handset, a mechanism to acknowledge "off hook" signals and "on hook" signals, and a recovery mechanism that resets the operation based upon signals transmitted along the aforesaid signal lines after the aforesaid "off hook" signals and the aforesaid "on hook" signals in an apparatus for the transmission and reception of data that performs different operations depending upon what the mechanism for acknowledgement of "off hook" signals and "on hook" signals has detected.

2 Claims, 6 Drawing Sheets

APPARATUS FOR THE TRANSMISSION AND RECEPTION OF DATA

This is a specification of application Ser. No. 07/670,108 filed Mar. 15, 1992, now abandoned.

BACKGROUND OF THE INVENTION

The present invention pertains to an apparatus used in handling communications through a telephone circuit designed to accommodate a large volume of communications. In particular, the invention under review pertains to an apparatus for the transmission and reception of data in which the transmission and reception of control signals between a movable telephone and an apparatus for transmission and reception of data is handled by serial data transmissions when communications, such as facsimile communications or telephone calls, are processed therethrough.

There has been much demand for car telephones and portable telephones that can handle communications in volume. With these kinds of telephones, which have been designed to handle a large volume of communications, transmission and reception of control signals between the movable telephone and the circuit connector are handled by serial data transmissions.

Nevertheless, should there be errors in transmission and reception of control signals originating in serial data signals between the movable telephone equipment and the apparatus for transmission and reception of data, there will be errors in acknowledgment made between the movable telephone and the apparatus for transmission and reception of data. For example, in Japanese Kokai No. 62-180655 (1987), there is discussion of an apparatus for transmission and reception of data that detects "on hook" signals and "off hook" signals in a telephone, and then, pursuant to what has been detected, the apparatus switches between a facsimile operation and a copying operation. There are times, however, when "on hook" signals and "off hook" signals will not be detected because of noise or temporary power outages. In such instances, the functions and operations of equipment for transmission and reception of data will not be relevant to what is happening at the telephone end.

SUMMARY OF THE INVENTION

The present invention was conceived to solve the problems that have been inherent with traditional technology. Its technological highlight is that it will enable an apparatus for transmission and reception of data to go into operation in response to what is happening at the telephone end even in instances where "on hook" signals or "off hook" signals have not been detected.

The apparatus for the transmission and reception of data has signal lines that provide a connection between the movable car telephone and the handset, a mechanism to acknowledge "off hook" signals and "on hook" signals, and a recovery mechanism that resets operations in accordance upon signals transmitted along the aforesaid signal lines following the aforesaid "off hook" signals and the aforesaid "on hook" signals in an apparatus for the transmission and reception of data that performs different types of functions and operations depending upon what the mechanism for acknowledging "off hook" signals and "on hook" signals has discerned.

With the present invention under review, even if "on hook" signals and "off hook" signals cannot be detected, the recovery mechanism will re-set the apparatus for transmission and reception of data by signals that are transmitted after the "on hook" and "off hook" signals. Therefore, even in instances where there is no detection of "on hook" or "off hook" signals, if the recovery mechanism should detect other signals, it can cause the apparatus for transmission and reception of data to go into operation in response to what is happening at the telephone end after those other signals have been detected. This is the first technological achievement of its kind.

The foregoing and other objects, features and advantages of the invention will be apparent from the following more particular description of a preferred embodiment of the invention as illustrated in the accompanying drawings.

DETAILED DESCRIPTION OF THE INVENTION

First, a general explanation of the invention under review is in order.

In the transmission line connection between the movable car telephone (1) and the handset (2), a circuit controller (hereinafter referred to as the "NCU") (10) determines what transmissions are occurring by means of serial data signals in the serial signal line (18S) (upward) and the serial signal line (18R) (downward) as viewed in FIG. 2.

As shown in the diagram which provides a general explanation of the apparatus for transmission and reception of data, we can assume that the handset (2) has been lifted, which will mean that the equipment is "off hook". It is assumed that the NCU (10) was not able to read the upward "off hook" signal, "101001Y1" (Y =1: "off cradle"; Y =0: "on cradle"). After that, users, as they hold the handset (2), will dial a number, and, as a result, a telephone call will be made. The downward indicator "on" signal during a telephone call "10100111" will be transmitted. Assuming that the NCU (10) has read that signal, it will know that the telephone is "off hook". Therefore, the NCU (10) will re-set the apparatus to where it should be when the "off hook" signal arrived.

On the other hand, we will assume that a telephone call is over and that the handset (2) has been put back to where it was, which will mean that the equipment is "on hook". We will assume that the NCU (10) was not able to read the upward "on hook" signal, "101001Y0".

Thereafter, assuming that a telephone call is being made and that the NCU (10) did read the incoming indicator "on" signal, it would know that the telephone was "on hook". Therefore, the NCU (10) will re-set the apparatus to where it should be when the "on hook" signal arrived.

As is apparent, because it can accurately discern what the equipment is trying to do at the moment, the NCU can accurately select to initiate or end a telephone call, in which the handset will be used, or the select the transmission, reception, or copy mode, in which the facsimile machine will be used, because the NCU (10) will be able to ascertain precisely what is going on at the time.

Provided herein is explanation of an example of the apparatus for transmission and reception of data.

Figure 1:
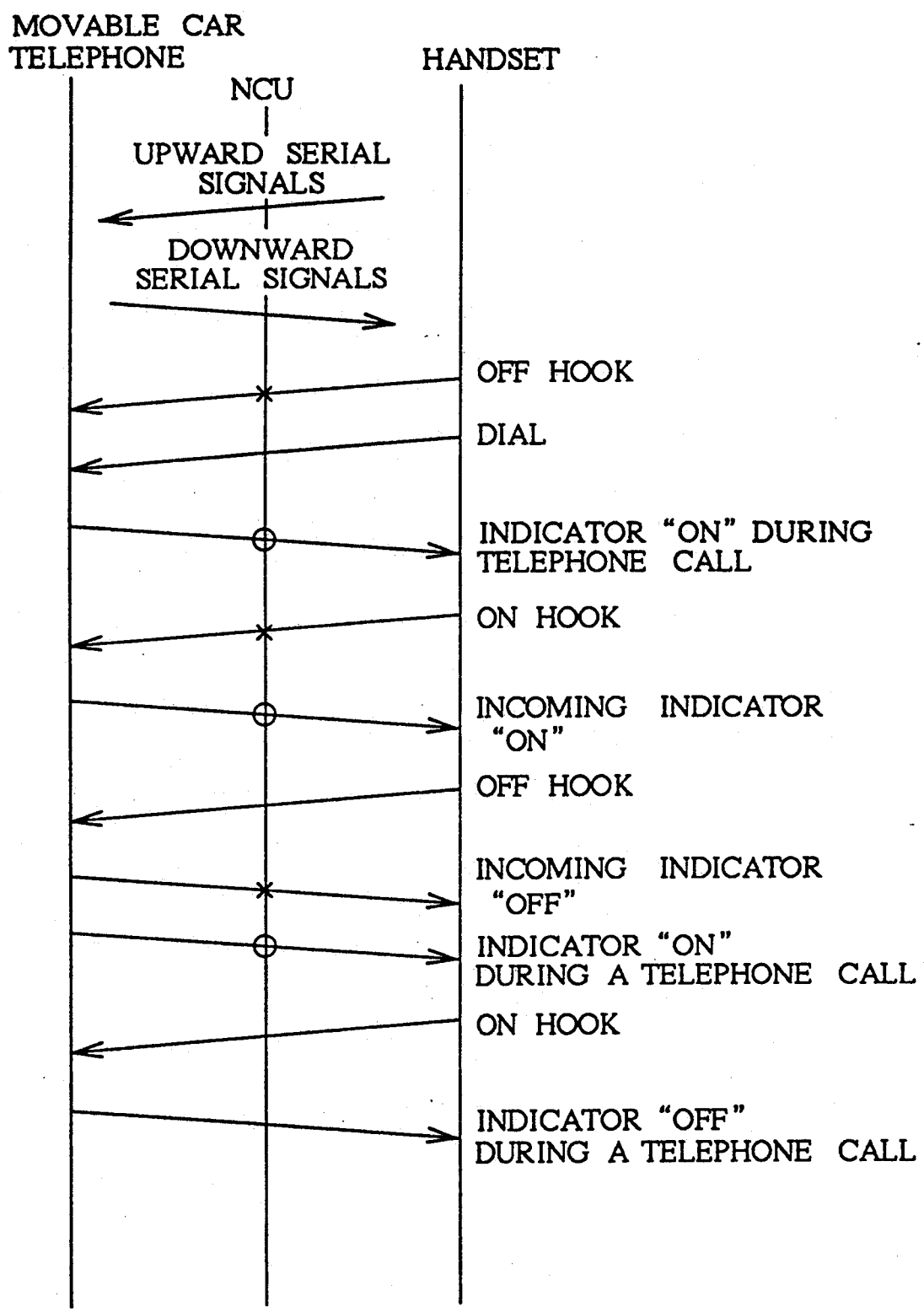
FIG. 1 is a diagram that provides a basic explanation of the apparatus for transmission and reception of data that pertains to the invention under review.
Figure 2:
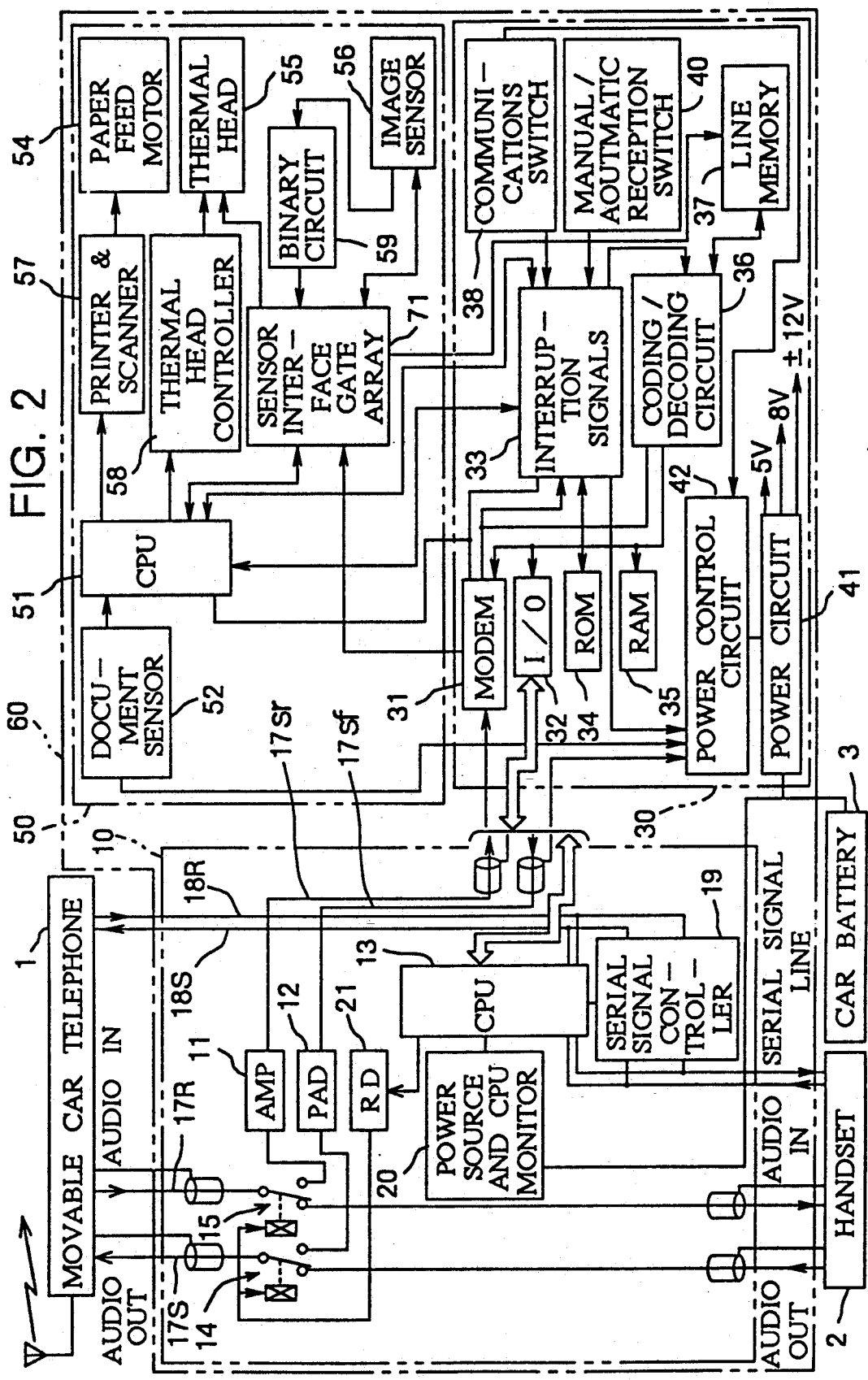
FIG. 2 is a diagram that illustrates the overall design of a movable telephone to used in an automobile with which an apparatus for transmission and reception of data, which is one example of how the invention under review can be implemented, is utilized.

FIG. 2 is a diagram that illustrates the overall design of a movable car telephone with which there is used an apparatus for the transmission and reception of data, which is an example of the present invention.

In the diagram, this example is a facsimile machine (60) which is connected to a handset (2) that serves as the telephone equipment. The movable car telephone (1), which is an example of how the invention under review can be utilized, handles one communications circuit in a commercial telephone circuit network and telephone calls and facsimile communications. The circuit controller (hereinafter referred to as the "NCU") (10) will be such that connections between the movable car telephone (1) and the communications controller (30) and the facsimile mechanisms, consisting of a printer and the scanner (50), can be switched by switching actions/operations in that the movable car telephone (1) and the handset (2) will usually be connected.

The movable car telephone is a wireless apparatus for transmission and reception, which is commonly known in the industry. The handset (2) will include a telephone receiver for transmission and reception when this example of the invention is and a serial signal controller 19 to be used as a telephone, and, if necessary, there can be push buttons on it. Therefore, it is typical of the types of telephones that can be used in automobiles. The movable ca telephone (1) and the handset (2) will usually be connected, which will enable connection between the movable car telephone (1) and the facsimile machine (6) to be managed by switching operations.

In the overall set-up for the facsimile machine (60), the power circuit (41) will get its power supply from the battery (3) in the vehicle. In addition, its design will generally be the same as the design used for conventional facsimile machines found in offices. A communications control circuit (33), which is equipped with a microcomputer, will operate in accordance with a program that has been recorded in the ROM (34).

More specifically, the facsimile machine (60) is equipped with a circuit controller (10), a communications controller (30) and a printer and scanner (50).

The NCU (10) is equipped with an audio signal line (17R) (reception), which is similar to the audio signal line (17S) (transmission), which is similar to the one found in typical facsimile machines used in offices, switching relays (14) and (15) for the audio signal line (17R), an AMP (11), a PAD (12), a relay drive (RD) (21), a CPU monitor (20), and a serial signal line (18S) (upward) and a serial signal line (18R) (downward) to control communications in the automobile; it monitors serial data signals between those devices and the movable car telephone (1). It has a line connection control circuit (13) to control the line. The aforesaid line connection control circuit (13) outputs signals for relay switching control for the aforesaid switching relays (14) and (15). The aforesaid line connection control circuit (13) consists of a microcomputer, and the program that is incorporated into that microcomputer is explained in FIGS. 4 and 5.

The communications controller (30) in the facsimile machine (60), which is an example of the invention under review, is designed in the following manner.

The modem (31) is a modulator/demodulator that modulates and demodulates digital signals using carrier waves in audio wave frequencies ranges; it is a device that is commonly known in the field. The communications control circuit (33) is a circuit to program and control the facsimile machine (60) which consists of a microcomputer and other devices.

The ROM (34) serves as an extendable memory, and it is the memory in which the program that controls the aforesaid electronic control circuit (33) has been recorded. The RAM (35), which receives signals from the electronic control circuit (33), is a read-write unrestricted memory that directly records picture image data from the modem (31). The coding/decoding circuit (36) directly records picture image data from the modem (31), transfers and records picture image data, which has been temporarily recorded in the RAM (35), and has the capacity to record and control output of line data on the amount of space per page allotted to the line memory (37). The line memory (37) records data, which has been recorded in the coding/decoding circuit (36) and outputs that recorded data in 8-bit parallel data.

The car battery (3) provides the electricity, and the power source circuit (41) converts that electricity to various constant voltage values. The power source control circuit (42) provides control s that the various constant voltage values will be furnished to the relevant components from the aforesaid power source circuit (41) by means of incoming call signals from commercial telephone circuits, the document sensor (52) that detects the existence of a document, and signals from the communications switch (38) and the communications control circuit (33).

In addition, into the aforesaid communications control circuit (33) are input signals from the communications switch (38) and signals from the manual/automatic exception switch 40 that enables changeover from manual reception to automatic reception. Those signals are used in setting functions to receive signals, which have been transmitted from the movable car telephone (1), without involving the handset in the automobile. For example, that function can be used to receive automatically facsimile communications when there is no one in the vehicle.

The printer and scanner (50) for the facsimile machine (60) is designed in the following manner.

The sensor interface gate array (71) is used for copying control of the thermal head (55), and it outputs as serial data, information to the thermal head (55) that copies parallel data onto heat-sensitive paper. The thermal head controller (58) provides electricity to the aforesaid thermal head (55) and controls copying. The paper feed motor (54) is a pulse motor that advances the heat-sensitive paper one line at a time, and it is driven by a motor driver (57). The image scanner (56), which reads the document, is input into the sensor interface gate array (71) via a binary circuit (59).

The parts and components of the printer and scanner (50) are controlled by the copying/reading control circuit (51). The control methods for those parts and components are ones that are commonly used in the industry and there is no direct relationship between those methods and the features of the present invention. For that reason, details on them are not included herein.

The communications controller (30) and the printer and scanner (50) for the facsimile machine 60 transmit signals in the manner described below in an interface with the parts and components, which have been discussed in previous sections herein.

When the power source is plugged in, the line connection control circuit (13) in the NCU controls the circuit connection. The communications control circuit (33) for the circuit controller (30) handles the circuit connection request action. Specifically, the line connection control circuit (13) initializes the internal memory as soon as the power source is plugged into it. Standby (no communications, command waiting) signals are also output to the output port. Therefore, neither switching relay (14) or switching relay (15) will be "on"; they are connected at the handset (2) shown in FIG. 2. The aforesaid line connection control circuit (13) is waiting for circuit request signals from the circuit controller (30); the line connection control circuit (13) is, therefore, at "standby".

The communications control circuit (33) in the communications controller (30) initializes the internal memory as soon as the power source is plugged into it. It also outputs standby (no communications, command waiting) signals to the output port, and waits for the communications switch (38) to be closed; the communications control circuit (33) is, therefore, at "standby".

The following is an explanation of the control operations of the line connection control circuit (13) and the communications control circuit (33) during various kinds of communications.

Figure 3:
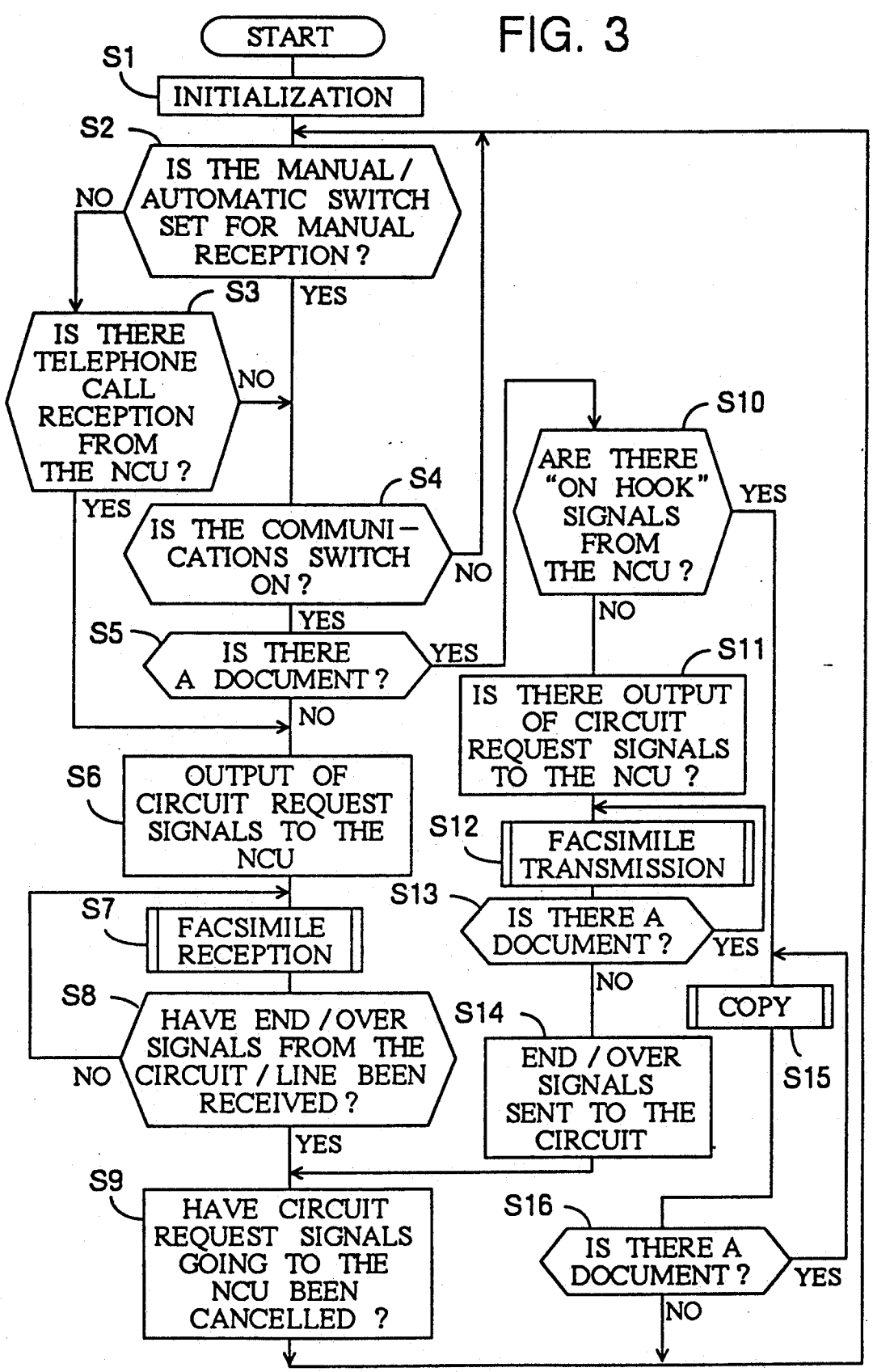
FIG. 3 is a flowchart for the communications control circuit for the movable car telephone with which an apparatus for transmission and reception of data, which is one example of how the invention under review can be implemented, is utilized.

The basic control operations of the communications control circuit (33) are as shown in the flowchart for a communications control circuit (33) in a car telephone with which there is utilized an apparatus for transmission and exception of data, which pertains to one example of how the present invention can be implemented, as is illustrated in FIG. 3.

Initialization occurs at Step S1, and there is a determination of whether the reception switch 40 has been designated for manual reception or automatic reception at Step S2. When the manual/automatic reception switch 40 has been designated for manual reception, the communications control circuit is at "standby" until there is a determination that the communications switch (38) is "on" at Step S4. As soon as there is a determination that the communications switch (38) is "on" at Step 54, there will be a determination on whether there is a document in the document feeder at Step S5. If there is no document present in the document feeder, the reception mode will be selected. As a result, circuit request signals will be output to the NCU (10) at Step S6. At Step S7 and Step S8, the facsimile reception routine will be executed. End/Over signals will be acknowledged by the audio signal line (17R), and until End/Over signals are acknowledged by the audio signal line (17R), the processes of the routine in Step S7 and step S8 will continue.

The aforesaid facsimile reception routine is a reception action/operation that is commonly known in the industry. For that reason, there will not be a detailed explanation on it provided herein.

Once End/Over signals have been acknowledged by the audio signal line (17R) in Step S8, circuit request signals to the NCU (10) will be cancelled, which will put the apparatus at "standby" at Step S2.

In the opposite case, the manual/automatic reception switch (40) will be set for automatic reception at Step S2. When a telephone call incoming signals from the NCU (10) are acknowledged to be "off" at Step S3, the next step will be Step S4. When the telephone call incoming signals from the NCU (10) are acknowledged to be "on" at Step S3, the next step will be Step S6. Each process in these routines, discussed earlier herein, will then be executed.

Furthermore, once the communications switch (38) is deemed to be "on" at Step S4 and it has been acknowledged that there is a document in the document feeder at Step 5, "on hook" signals from the NCU (10) will be acknowledged at Step S10. If "on hook" signals from the NCU (10) are deemed to be "off hook", that will mean that the transmission mode will be selected. Therefore at Step S11 circuit request signals will be output to the NCU (10).

As a result, at Step S12 and Step S13, the facsimile transmission routine will be executed. The processes in the routine for Step S12 and Step S13 will continue until it is acknowledged that there are no more sheets of the document in the document feeder. At Step S13 when it has been acknowledged that there are no more sheets of the document in the document feeder, End/Over signals will be transmitted to the audio signal line (17R) at Step S14. At Step S9 circuit request signals going to the NCU will be cancelled, and the apparatus will be in "standby" at Step S2. In that the facsimile transmission routine is an operation that is commonly known in the field, there will not be a detailed explanation of it provided herein.

If at Step S the communications switch is acknowledged to be "on", at Step S5 it is acknowledged that there is a document in the document feeder, and at Step S10 "on hook" signals from the NCU (10) are acknowledged to be "on hook" signals, that will mean that the copy mode will be selected. As a result, at Step S15 and Step S16, the copy routine will be executed, and the processes in the routine for Step S15 and Step S16 will be executed until there are no more sheets of the document in the document feeder. When it is acknowledged that there are no more sheets of the document in the document loader at Step S16, the apparatus will be at "standby" at Step S2. In that the aforesaid copy routine is an operation that is commonly known in the industry, there will not be a detailed explanation of it provided herein.

The aforesaid flowchart has been broken down into the transmission mode, the reception mode, and the copy mode. Each mode is explained below.

Transmission Mode

For facsimile transmissions, as soon as the operator takes the handset "off hook" and makes a telephone call, the fact that the equipment is "off hook" will be detected by the line connection control circuit (13) in the NCU (10) and "off hook" signals will be sent to the communications control circuit (33). After that, as soon as the operator places the document into the document feeder for the scanner and printer (50) and pushes the communications switch (38), the document is screened by the document scanner (52), and, moreover, the communications switch (38) is closed while it is being depressed. In response to the closing of the communications switch (38), the communications control circuit (33) outputs circuit request signals to the line connection control circuit (13) in the NCU (10) from "standby", which is discussed in earlier sections herein.

In response, the line connection control circuit (13) switches on power to the switching relays (14) and (15) from "standby", discussed above and it waits for the end of the circuit request signals from the communications control circuit (33) (the conclusion of the facsimile communication). As a result, the point of contact of the switching relays (14) and (15) change from connection at the handset (2) to connection at the facsimile machine (60). In consequence, the facsimile machine (60) will be connected to the movable car telephone.

At that point, the communications control circuit (33) transmits one page of the document to be sent in the facsimile transmission. As soon as that has been completed, the communications control circuit (33) checks the detection signals of the document scanner (52) and, then, as soon as the next page of the document is screened, that following page of document will be sent in the facsimile transmission. In this manner, the communications control circuit (33) continues to repeat the facsimile transmission mechanisms until there are no more pages of the document in the document feeder. When there are no more pages of the document in the document feeder, the communications control circuit (33) cancels the circuit request signals going to the line connection control circuit (13), which puts the apparatus back into "standby".

Reception Mode

For facsimile reception, when the manual/automatic reception switch (40) has been designated for automatic reception, as soon as there are incoming signals via the movable car telephone (1), the line connection control circuit (13) inputs that there are incoming signals to the communications control circuit (33) of the communications controller (30) from "standby", which was discussed in earlier sections herein. That information is received, and the communications control circuit (33) transmits circuit request signals to the line connection control circuit (13). The line connection control circuit (13) transmits "off hook" signals to the movable car telephone (1) in response to these circuit request signals, turns the switching relays (14) and (15) on, and waits for the circuit request signals from communications control circuit (33) to end. As a result, the connection of the switching relays (14) and (15) change from connection at the handset (2) to the AMP (11) and PAD (12). This enables the facsimile machine (60) to be connected to the movable car telephone (1). At that point, the communications control circuit (33) is engaged in the reception. When the transmission End/Over signals have been communicated from the movable car telephone, the circuit request signals going to the aforesaid line connection control circuit (13) are cancelled, which will put the equipment back into "standby", which was discussed in earlier sections herein. In response to the cancellation of the circuit request signals, the aforesaid line connection control circuit (13) shuts off the power to the switching relays (14) and (15) and transmits "off hook" signals to the movable car telephone (1). As a result, the equipment will be put back into "standby", as discussed earlier.

The following is an explanation of the reception mode when the manual/automatic reception switch (40) is set for manual reception. When the operator puts the equipment "off hook" while a telephone call is being placed and there is no document in the document feeder, the line connection control circuit (13) inputs "off hook" signals to the communications control circuit (33), and the document sensor (52) inputs to the communications control circuit (33) that there is no document to the communications control circuit (33). At that point, as soon as the operator shuts off the communications switch (38) the communications control circuit (33) outputs circuit request signals to the line connection control circuit (13). In response to these circuit request signals, the circuit connection control circuit (13) turns the power on to the switching relays (14) and (15) and waits for the circuit request signals from the communications control circuit (33) to be over. In consequence, the connection of the switching relays (14) and (15) is changed from connection at the handset (2) to the AMP (11) and PAD (12). This will enable the facsimile machine (16) to be connected to the movable car telephone. The communications control circuit (33) will be engaged in reception at that point. In addition, as soon as the transmission End/Over signals are communicated from the movable car telephone, the circuit request signals going to the aforesaid line connection control circuit (13) will be cancelled, which will put the equipment back into "standby". In response to the cancellation of the circuit request signals, the aforesaid line connection control circuit (13) will shut off power to the switching relays (14) and (15). As a result, the equipment will return to "standby", as was described in earlier sections herein.

Copy Mode

For copying, the operator will place the document in the document loader and reset the receiver of the telephone receiver of the handset. This will put the equipment "on hook". As soon as that has occurred, the fact that the equipment is "on hook" will be detected by the line connection control circuit (13) of the NCU (10). The "on hook" signals will then be input to the communications control circuit (33) and the document sensor (52) will input information that there is a document to the communications control circuit (33). At that point, when the operator presses the communications switch (38), the communications switch (38) will be closed while it is being depressed. In response to the closing of the communications switch (38), the communications control circuit (33) will change from "standby" to the copy mode. Copying processes will be repeated until there are no more pages of the document in the document feeder left to be copied. As soon as there are no more pages of the document left to be copied in the document feeder, the communications control circuit (33) will revert to "standby", as was discussed in previous sections herein.

The operation and action of the line connection control circuit (13) will be explained next.

Figure 4:
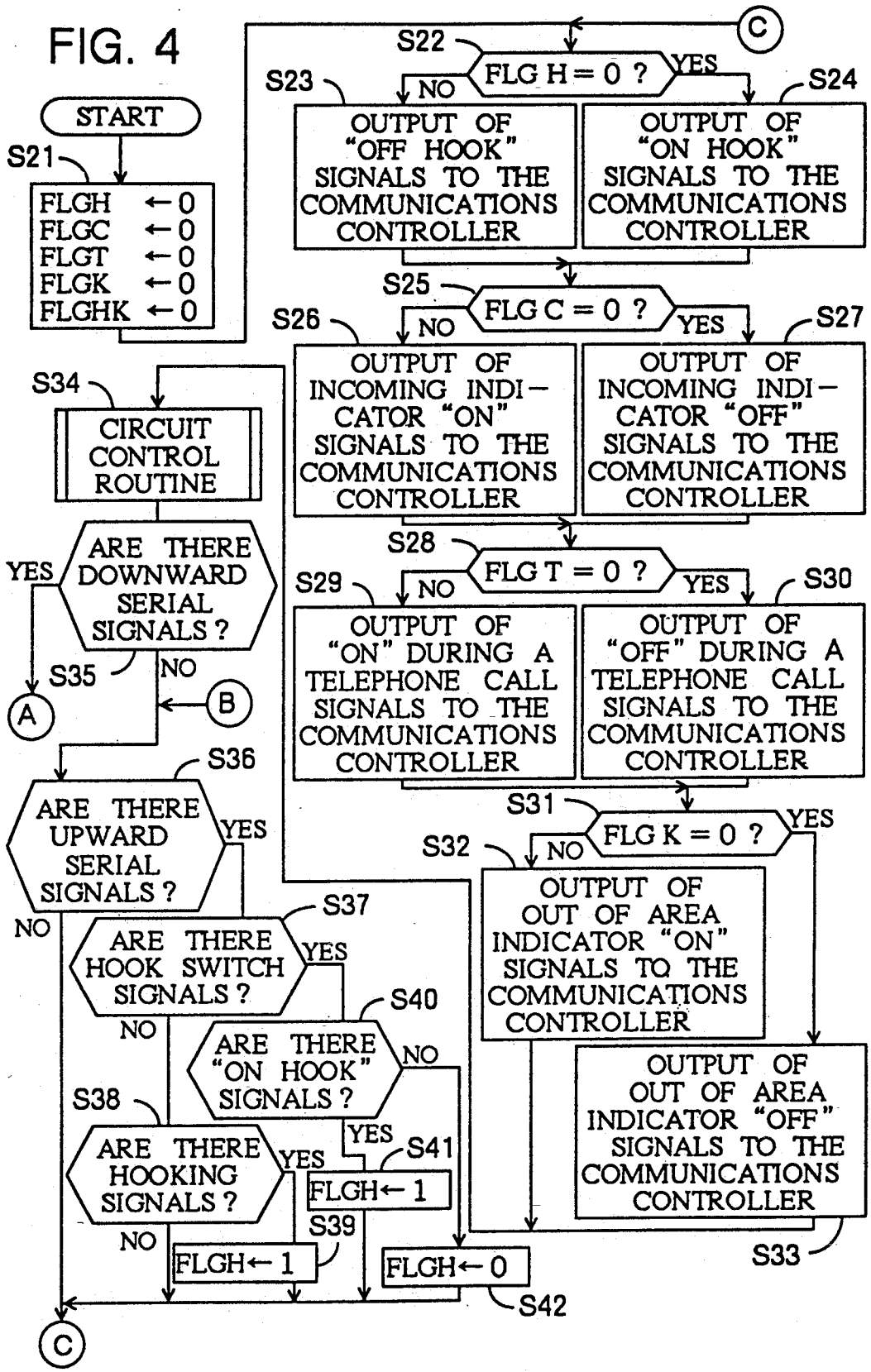
FIGS. 4 through 6 are flowcharts for the circuit connection control circuit for the movable car telephone with which an apparatus for transmission and reception of data, which is one example of how the invention under review can be implemented, is utilized.
Figure 5:
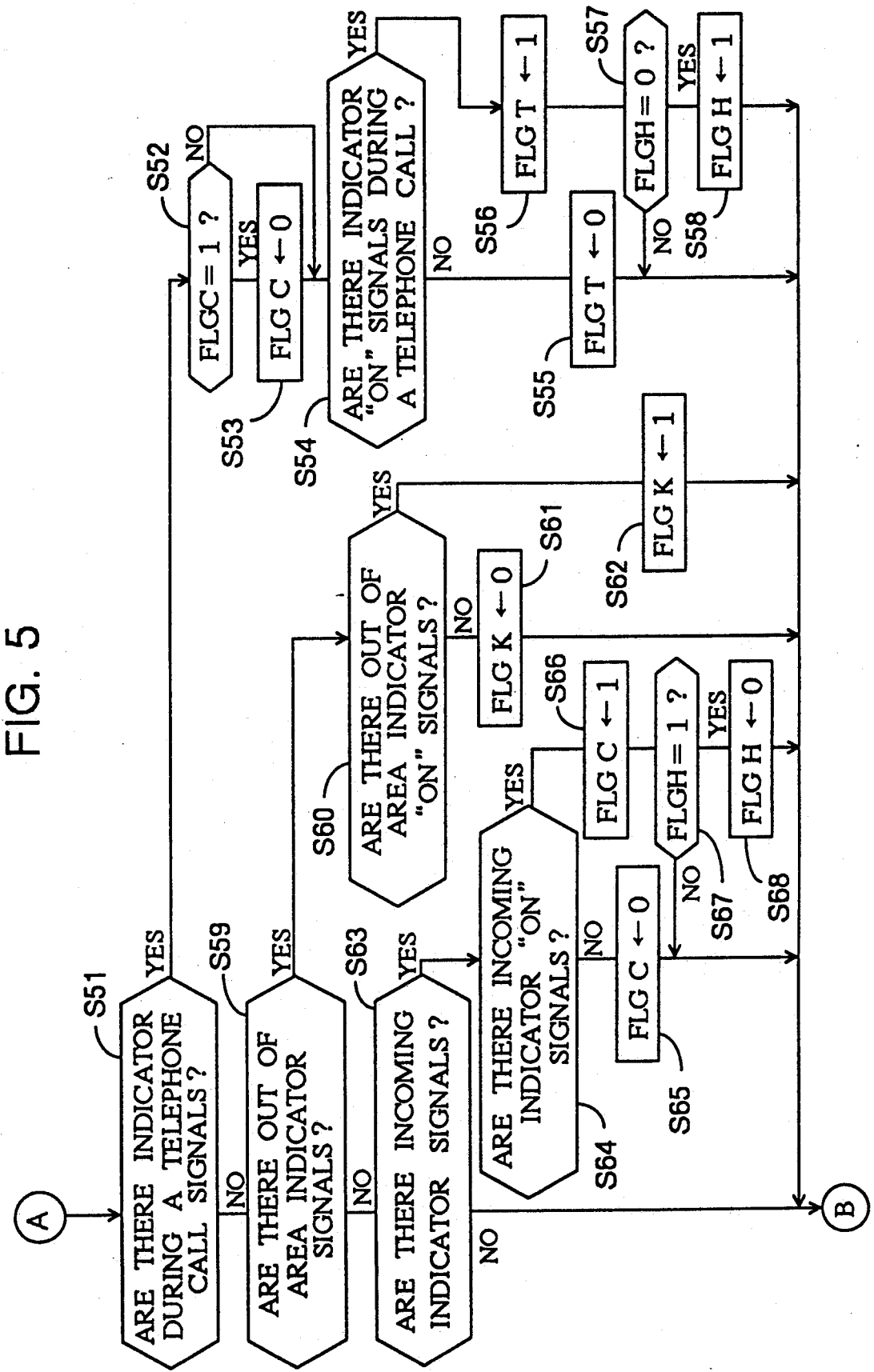
Figure 6:
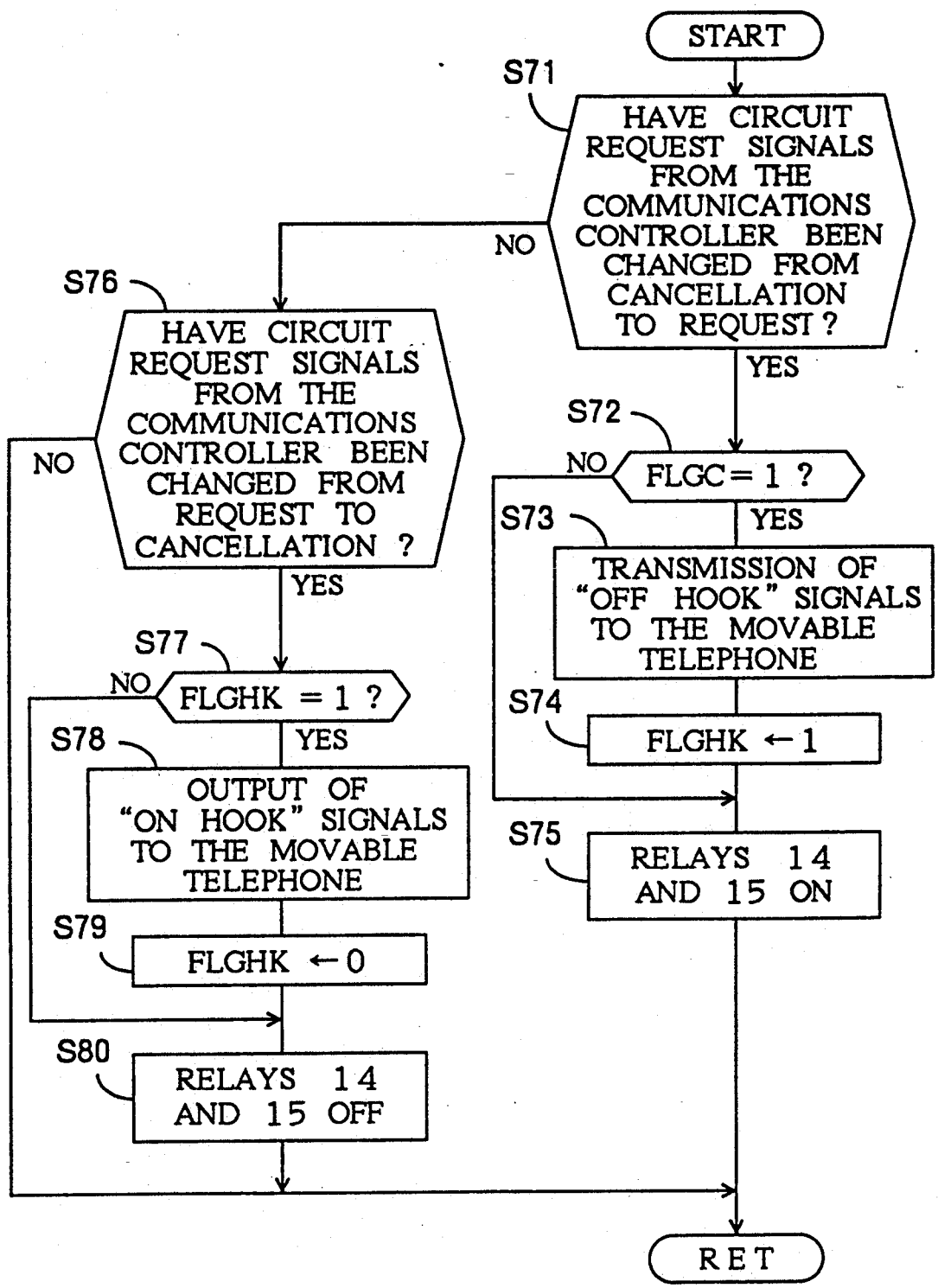

FIGS. 4 through 6 are flowcharts for the line connection control circuit (13) for the movable car telephone with which an apparatus for transmission and reception of data is utilized.

First, at Step S21, the flag (FLGH), which records the "on hook" status, is cleared (FLGH =0). When the aforesaid flag (FLGH) is cleared, it will indicate "on hook" status while the telephone receiver is in place.

When flag is set, it will indicate "off hook" status. In addition, flag FLGC, which records the incoming indicator "on" status, which causes the equipment to ring when there are incoming calls, will be cleared. When the aforesaid flag FLGC is cleared, it indicates incoming indicator "off" status, and when it is set, it indicates incoming indicator "on" status. The flag FLGT, which records the indicator "on" during a telephone call, will also be cleared. When it is set, the aforesaid flag FLGT indicates the indicator "on" during a telephone call status to show that at the present time there is a telephone call in progress. When the flag is cleared, it will indicate the indicator "off" during a telephone call status. Flag FLGK, which records the out of area indicator "on" status to indicate whether the communication is within the specified communications service area, will be cleared. When the aforesaid flag FLGK is set, it indicates the out of area indicator "on" status; when it is cleared, it indicates the out of area indicator "off" status. The FLGHK, which records that the NCU (10) has sent "off hook" signals to the movable car telephone (1), is also cleared. When the FLGHK is cleared, it indicates that the NCU (10) has sent "off hook" signals to the movable car telephone (1). In this manner, each flag is initialized.

At Step S22, there is a determination on whether the flag FLGH, which records the "on hook" status, has been reset. If the flag has been set, "off hook" signals will be output to the communications controller (30) at Step S23, and if the flag has been reset, "on hook" will be output to the communications controller (30) at Step S24. The processes will then continue on to Step S25.

At Step S25, a determination is made on whether the flag FLGC, which records incoming indicator "on" status, has been reset. When the flag has been set, the incoming indicator "on" signal is output to the communications controller (30) at Step S26. When the flag has been reset, the incoming indicator "off" signal is output to the communications controller (30) at Step S27. The processes will then continue on to Step S28.

At Step S28, a determination is made on whether the flag FLGT, which records the indicator "on" status during a telephone call, has been reset. When the flag has been set, the indicator "on" during a telephone call signal will be output to the communications controller (30) at Step S29. When the flag has been reset, the display "off" during a telephone call signal will be output to the communications controller (30) at Step S30. The processes will then continue on to Step S31.

At Step S31, a determination is made on whether the flag FLGK, which records the out of area indicators "on" status, has been reset. When the flag has been set, the out of are display "on" signal will be output to the communications controller (30) at Step S32. When the flag has been reset, the out of area display "off" signal will be output to the communications controller (30) at Step S33. Then the processes of the line control routine begins.

As soon as the line control routine is called, at Step S71 (see FIG. 6), there will be a determination on whether the circuit request signals in the communications controller (30) have changed from cancellation to request. When it is deemed that the circuit request signals in the communications controller (30) have changed from cancellation to request, at Step S72, there will be a determination on whether the flag FLGC, which records the incoming indicator "on", has been set. If the flag has been set, at Step S73 "off hook" signals will be sent to the movable car telephone (1). As a result, at Step S74, the flag FLGHK, which records that the NCU (10) has sent the "off hook" signals to the movable car telephone", will be set. At Step S75, the switching relays (14) and (15) will be "on", which will end the routine.

At Step S71 when it is acknowledged that the circuit request signals in the communications controller (30) are being changed from cancellation to request, it is acknowledged that the circuit request signals in the communications controller (30) have changed from cancellation to request, and that the flag FLGC, which records the incoming display "on", has been reset at Step S72, then at Step S75 the switching relays (14) and (15) will be "on", which will end the routine.

In addition, at Step S71, when it is acknowledged that the circuit request signals in the communications controller (30) have not changed from cancellation to request at Step S76 there will be a determination on whether the circuit request signals in the communications controller (30) have changed from request to cancellation, and if the circuit request signals in the communications controller (30) have changed from request to cancellation at that time, at Step S77 there will be a determination on whether the flag FLGHK, which records that the NCU (10) has sent out "on hook" signals to the movable car telephone (1), has been set. If that flag has been set, at Step S78 "on hook" signals will be transmitted to the movable car telephone (1). At Step S79 the flag FLGHK, which records that the NCU (10) has sent out "off hook" signals to the movable car telephone (1), will be set. Then at Step S80, the switching relays (14) and (15) will be off. As a result, the routine will end. Furthermore, at Step S71, should it be determined that the circuit request signals in the communications controller have not changed from cancellation to request, but at Step S76 there is a determination that the circuit request signals in the communications controller (30) have changed from request to cancellation, if the flag FLGHK, which records that the NCU (10) has sent out "off hook" signals to the movable car telephone (1), has not been set at Step S77, at Step S80, the switching relays (14) and (15) will be "off". As a result, the routine will end. In addition, if, at Step S71, it is determined that the circuit request signals in the communications controller (30) have not changed from cancellation to request, and it is determined at Step S76 that the circuit request signals in the communications controller (30) have not changed from cancellation to request, the routine will end.

Specifically, in response to the circuit request signals from the communications controller in the facsimile machine (60), the NCU (10) switches the line to the facsimile machine (60) and the handset (2). When the facsimile is set for automatic reception, the NCU (10) will be "off hook". In that it is connected to the telephone, it switches the line to the facsimile machine (60). When automatic reception is over, the NCU (10) will be "on hook", which will disconnect the telephone. After that the line will go back to the handset (2).

At Step S35 there is a determination on whether there is downward serial data arriving at the handset (2) from the movable car telephone (1) or whether there is upward serial data arriving at the movable car telephone (1) from the handset (2).

First, when it is determined that there is upward serial data arriving at the movable car telephone (1) from the handset (2), at Step S37 there will be a determination on whether that data is hook signals that acknowledge operations of the receiver. When that data is not hook signals, there will be a determination on whether they are hooking signals from operations of the speaker button at Step S38. When the signals are hooking signals, the telephone receiver will be deemed to have been lifted and at Step S39 the flag FLGH will be set (FLGH < −1). In addition, at Step S37, when the signals are acknowledged to be flag signals that acknowledge operations of the telephone receiver, at Step S40 there will be a determination on whether those signals are "on hook" signals. When the signals are "on hook" signals at Step S42 the flag FLGH will be cleared: when the signals are not "on hook" signals, at Step S41, the flag FLGH will be set.

Specifically, in the routine from Step S36 to Step S42, there will be a determination on whether signals are hook signals. When the signals are "on hook" signals, the flag FLGH, which records "on hook" signals, will be cleared; when the signals are "off hook" signals, the flag FLGH will be set, and as a result, the status of the telephone receiver will be recorded.

As soon as there is a determination that signals are downward serial data signals that will arrive at the handset (2) from the movable car telephone (1) at Step S35, there will be a determination of whether signals are indicator signals during a telephone call at Step S51. When the signals are indicator signals during a telephone call, at Step S52 there will be a determination on whether the flag FLGC, which records the incoming indicator "on" status, has been set and whether the signals have been mistaken for generation of a read-out tone and have not been recorded. When flag FLGC, which records the incoming indicator "on" status, has been set, there will be a telephone call already in progress. Therefore, at Step S53 the flag will be re-set. At Step S54 there will be a determination of indicator "on" during a telephone call status, and if there is no indicator "on" during a telephone call, at Step S55 the flag 25 FLGT will be cleared. As a result, the routine starting from Step S36 will commence. As soon as the indicator "on" during a telephone call has been determined, at Step S56 the flag FLGT will be set. In addition, at Step S57 the fact that the flag FLGT has been set will be noted and there will be a determination of whether the telephone receiver is in its place. When the flag FLGH has been cleared, it can be confirmed that the telephone receiver has been raised by the indicator signals during a telephone call. Therefore, if the clearing of the flag FLGH is in error, at Step S58 the flag FLGH will be set and the routine will begin from Step S36. In addition, when it has been confirmed the flag FLGH has been set at Step S57, that will mean that the telephone receiver has been lifted. As a result, the routine will begin from Step S36.

In the routine for Step S52 to Step S58, flag FLGC and flag FLGH will be reviewed.

When it has been determined that signals are downward serial data signals at Step S35, but it has been determined that signals are not indicator signals during a telephone call at Step S51, at Step S59 there will be a determination on whether signals are out of area indicator signals. If at Step S59 it is determined that the signals are out of are indicator signals, at Step S60, there will be a determination of whether those signals are out of area indicator "on" signals. If the signals are not out of area indicator "on" signals, at Step S61 the flag FLGK will be cleared. Should the signals be out of area indicator "on" signals, however, the flag FLGK will be set at Step S62, and the processes in the routine will commence from Step S36.

At Step S35 if the signals are acknowledged to be downward serial data signals, but the signals are not acknowledged to be indicator signals during a telephone call at Step S51 and are not acknowledged to be out of area indicator signals at Step S59, at Step S53 there will be a determination of whether the signals are incoming indicator signals. If the signals are not incoming indicator signals, the processes of the routine will begin from Step S36. Should the signals be acknowledged to be incoming indicator signals at Step S63, at Step S64 the incoming indicator "on" status will be determined. If there is no incoming indicator "on", at Step S65 the flag FLGC will be cleared and the processes of the routine will begin from Step S36. If incoming indicator "on" signals are acknowledged, at Step S66 the flag FLGC will be set and at Step S67 the setting of the flag FLGH will be noted. Should the telephone receiver have been raised, there would be an inconsistency if there were an incoming display "on" when the flag FLGH has been set. Therefore, at Step S6@the flag FLGH will be cleared and the processes of the routine will commence from Step S36. In addition, should it be acknowledged at Step S67 that the flag FLGH has been cleared, that would mean that the telephone receiver has been put down, and the processes of the routine will commence from Step S36.

In the routine for Step S54 to Step S58, there will be a review of flag FLGH.

In the program that pertains to the example of how the present invention can be implemented, which is explained above, in routine from Step S36 to Step S42, "on hook" signals are used to determine the status of the telephone receiver. When signals are "on hook" signals, the flag FLGH will be set. When signals are "off hook" signals, the flag FLGH will be cleared. The flag FLGH will not be corrected at that time. Moreover, in the routine from Step S52 to Step S58, there will be a review of flag FLGC and the aforesaid flag FLGH by means of the indicator signals during a telephone call. Should there be an inconsistency, there will be correction of flag FLGC and/or flag FLGH. In the routine from Step S54 to Step S58, the aforesaid flag FLGH is reviewed by means of the communication indicator signals. Should there be an inconsistency, the aforesaid flag FLGH will be corrected.

As explained above, in an apparatus for the transmission and reception of data that handles transmission and reception of control signals between the movable car telephone (1) and the NCU (10) in volume by means of serial data signals, which are transmitted and received along serial signal lines (18R) and (18S), when signal codes of the serial data signal, which are transmitted and received along the aforesaid serial signal lines (18R) and (18S), cannot be discerned, in response to communications information from signal codes that can be discerned following the signal codes that could not be discerned, the apparatus for the transmission and reception of data, which pertains to the invention under review, corrects signal codes so that they will arrive where they should in the current state of a communication and stores those signal codes. Based upon signals running along the aforesaid signal lines following the aforesaid "on hook" signals and the aforesaid "off hook" signals, the apparatus for transmission and reception of data will determine the current status of a communication by a recovery process that re-sets operations.

Therefore, even if accurate acknowledgement of the signal codes for the serial data codes, which provide the control between the movable car telephone (1) and the handset (2) or facsimile machine (60), should be impeded because of noise or temporary power outage, if the signal codes in the serial data that arrive after those signal codes are discerned, the current status of a communication can be accurately determined by acknowledgment of conditions of a communication in which those signal codes have been transmitted or received. Consequently, the NCU (10) can accurately ascertain the current state of a communication, and, thus it can accurately select to initiate or end a telephone call, which will involve the use of the handset, or select to transmit, receive, automatically transmit or receive, or copy, which are functions in which the facsimile machine (60) will be utilized.

With the example of implementation of the present invention under review, even though the hook switch signals, the incoming indicator signals, the indicator signals during a telephone call, and the out of area indicator signals have been noted and those signals have already arrived, the signal codes that have been incorrectly acknowledged will be corrected. Implementation of the present invention, however, is not limited to the aforesaid signals; the present invention can be utilized for signals where there are time differences in a defined control relationship.

ADVANTAGES OF THE INVENTION

As explained above, in an apparatus for the transmission and reception of data that handles transmission and reception of control signals between the movable car telephone and the NCU in volume by means of serial data signals, which are transmitted and received along serial signal lines, when signal codes of the serial data signal, which are transmitted and received along the aforesaid serial signal lines, cannot be discerned, in response to communications information from signal codes that can be discerned following the signal codes that could not be discerned, the apparatus for the transmission and reception of data, which pertains to the invention under review, corrects signal codes so that they will arrive where they should in the current state of the communications and stores those signal codes. As a result, the apparatus for transmission and reception of data determines the current status of a communication.

Therefore, even if accurate acknowledgement of the signal codes for the serial data codes, which provide the control between the movable car telephone and the handset or facsimile machine, should be impeded because of noise or temporary power outage, if the signal codes in the serial data that arrive after those signal codes are discerned, the current status of a communication can be accurately determined b acknowledgment of conditions of a communication in which those signal codes have been transmitted or received.

Consequently, accurate discernment of the current state of a communication will enable the correct selection of initiation or termination of a telephone call, which will involve the use of the handset, or the selection of the transmission, reception, or automatic transmission or reception, or copy mode, which are functions that entail the usage of the facsimile machine.

While the invention has been particularly shown and described with reference to preferred embodiments thereof, it will be understood by those in the art that the foregoing and other changes in form and details may be made therein without departing from the spirit and scope of the invention.

What is claimed is:

1. An apparatus for the transmission and reception of data, the apparatus having a signal line for providing a connection between a movable car telephone and a handset, the apparatus comprising:
   transmitter means for transmitting off-hook and on-hook signals on the signal line, and for transmitting a signal after the transmission of one of the off-hook and on-hook signals;
   acknowledge means for recognizing a mode of operation of the apparatus by detecting one of the off-hook and on-hook signals transmitted on the signal line by said transmitter means; and
   recovery means for establishing the mode of operation of the apparatus according to a signal transmitted after the transmission of one of the off-hook and on-hook signals, said recovery means operable for establishing the mode of operation of the apparatus if said acknowledgement means fails to recognize the mode of operation of the apparatus by failing to detect one of the off-hook and on-hook signals transmitted on the signal line.

2. The apparatus as defined in claim 1, further comprising a facsimile machine, and a CPU, and wherein said CPU includes said acknowledgement means and said recovery means.

* * * * *